US012791341B2

(12) United States Patent
White et al.

(10) Patent No.: US 12,791,341 B2
(45) Date of Patent: Nov. 10, 2026

(54) SYSTEMS AND METHODS FOR GENERATING CONDITIONAL CUSTOMIZABLE CONTRACTION HIERARCHIES FOR VEHICLE NAVIGATION

(71) Applicant: Verizon Patent and Licensing Inc., Basking Ridge, NJ (US)

(72) Inventors: Hayden Sean White, Kaiapoi (NZ); David P. Manning, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 78 days.

(21) Appl. No.: 18/887,131

(22) Filed: Sep. 17, 2024

(65) Prior Publication Data

US 2026/0079018 A1 Mar. 19, 2026

(51) Int. Cl.
*G01C 21/34* (2006.01)
*G08G 1/01* (2006.01)

(52) U.S. Cl.
CPC ....... *G01C 21/3492* (2013.01); *G08G 1/0125* (2013.01)

(58) Field of Classification Search
CPC ........................ G01C 21/3446; G01C 21/3453
See application file for complete search history.

(56) References Cited

U.S. PATENT DOCUMENTS

| | | | | |
|---|---|---|---|---|
| 8,824,337 | B1 * | 9/2014 | Geisberger | H04L 45/12 701/410 |
| 2011/0224898 | A1 * | 9/2011 | Scofield | G08G 1/0104 701/532 |
| 2018/0051995 | A1 * | 2/2018 | Delling | G08G 1/096816 |
| 2019/0178649 | A1 * | 6/2019 | Lucus | G08G 3/00 |
| 2019/0178672 | A1 * | 6/2019 | Woolley | G01C 21/3415 |
| 2022/0051172 | A1 * | 2/2022 | Haag | G06Q 10/083 |
| 2022/0113152 | A1 | 4/2022 | Hidayat et al. | |
| 2023/0236025 | A1 | 7/2023 | White et al. | |

OTHER PUBLICATIONS

Bacherle, Multi via-Node Alternatives for Customizable Contraction Hierarchies (Year: 2024).*

(Continued)

*Primary Examiner* — Ryan Rink

(57) ABSTRACT

A device may receive traffic data associated with a vehicle, may generate a node-based graph based on the traffic data, and may generate an edge-based graph, a vertex order, and original arcs based on the node-based graph. The device may identify additional arcs that facilitate connectivity between all pairs of links of the edge-based graph, and may combine the additional arcs and the original arcs to generate CCH arcs. The device may determine arc configurations for the CCH arcs based on the vertex order, and may calculate parameters for the arc configurations. The device may combine the node-based graph, a priority order of links in the node-based graph, the original arcs, the CCH arcs, and the arc configurations to generate a CCCH, and may implement the CCCH for the vehicle.

20 Claims, 13 Drawing Sheets

(56) References Cited

OTHER PUBLICATIONS

Buchhold et al., "Customizable Contraction Hierarchies with Turn Costs," Website: https://drops.dagstuhl.de/storage/01oasics/oasics-vol085-tmos2020/OASIcs.ATMOS.20 20.9/OASIcs.ATMOS.2020.9.pdf, 2020, 15 Pages.
Dibbelt et al., "Customizable Contraction Hierarchies," arXiv:1402.0402v5, Aug. 24, 2015, 39 Pages.
Robert Geisberger, "Contraction Hierarchies: Faster and Simpler Hierarchical Routing in Road Networks," Diploma Thesis, Institut für Theoretische Informatik Universität Karlsruhe (TH), Jul. 1, 2008, 70 Pages.
Gottesbüren et al., "Faster and Better Nested Dissection Orders for Customizable Contraction Hierarchies," Algorithms, vol. 12, No. 196, Sep. 16, 2019, 20 Pages.

* cited by examiner

SYSTEMS AND METHODS FOR GENERATING CONDITIONAL CUSTOMIZABLE CONTRACTION HIERARCHIES FOR VEHICLE NAVIGATION

BACKGROUND

In applications of graph theory to computer science, the method of contraction hierarchies is a technique for decreasing a required time for determining a shortest path in a graph. Contraction hierarchies may be utilized with vehicle navigation applications, systems, and/or the like, where a driver wishes to travel from a starting location to a destination location using a quickest possible route.

DETAILED DESCRIPTION OF EXAMPLE EMBODIMENTS

Figure 1A:
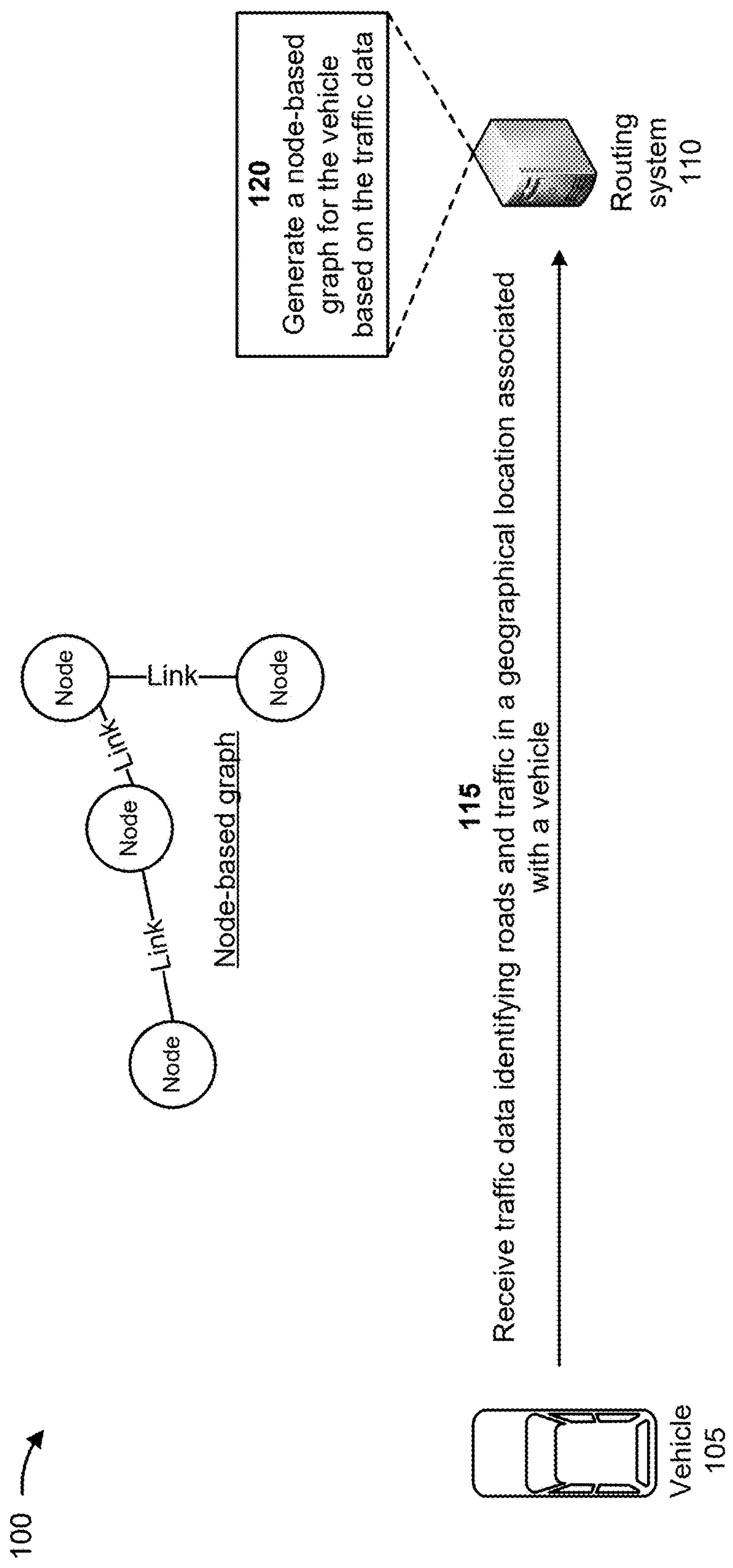
FIGS. 1A-1J are diagrams of an example associated with generating conditional customizable contraction hierarchies for vehicle navigation.

The following detailed description of example implementations refers to the accompanying drawings. The same reference numbers in different drawings may identify the same or similar elements.

Contraction hierarchies may be utilized to restrict a set of links (e.g., roads) that are followed to improve performance of routing queries while preserving optimal routes. A contraction hierarchy may optimize a metric associated with a route, such as travel time. In a contraction hierarchy, intersections are represented by nodes or vertices and roads are represented by edges connecting with the nodes. An edge weight represents a time it takes to drive along a segment of the road represented by the edge. For example, a path from node A to node B may include a sequence of edges (e.g., road sections), and a shortest path may be a path with a minimal sum of edge weights among all possible paths. A shortest path in a road network may be computed using Dijkstra's algorithm, but given that a road network may consist of tens of millions of nodes, this is impractical. A contraction hierarchy is a method that reduces computation time for determining shortest paths in road networks based on exploiting properties of graphs representing the road networks. The reduction of computation time may be achieved by creating shortcuts in a preprocessing stage which are then used during a shortest path query to skip over unimportant vertices. This technique is based on the observation that road networks are highly hierarchical. However, the preprocessing stage is resource-intensive, time-consuming, and significantly slows down the process of accommodating real-time road network changes. Furthermore, existing routing models that incorporate conditional constraints (e.g., conditional contraction hierarchies) require extensive searching and processing to establish cost-effective paths when dealing with these conditional constraints.

Thus, current techniques for utilizing a contraction hierarchy to generate navigational routes consume computing resources (e.g., processing resources, memory resources, communication resources, and/or the like), networking resources, and/or other resources associated with utilizing the time-consuming pre-processing stage to accommodate real-time road network changes, utilizing extensive searching and processing to establish cost-effective routes associated with conditional constraints, handling poor user experience associated with failing to provide accurate navigational routes that accommodate real-time road network changes, and/or the like.

Some implementations described herein provide a routing system that generates conditional customizable contraction hierarchies (CCCH) for vehicle navigation. For example, the routing system may receive traffic data identifying roads and traffic in a geographical location associated with a vehicle. The routing system may generate a node-based graph based on the traffic data, and may generate an edge-based graph, a vertex order, and original arcs based on the node-based graph. The routing system may identify additional arcs that facilitate connectivity between all pairs of links of the edge-based graph, according to link priority ordering, and may combine the additional arcs and the original arcs to generate customizable contraction hierarchy (CCH) arcs. The routing system may determine arc configurations for the CCH arcs based on the vertex order of vertices in the edge-based graph, and may calculate parameters for the arc configurations based on examining lower triangles associated with the CCH arcs. The routing system may filter the arc configurations to remove sub-optimal arc configurations and to generate final arc configurations, may combine the node-based graph, a priority order of links in the node-based graph, the original arcs, the CCH arcs, and the final arc configurations to generate a CCCH, and may implement the CCCH for the vehicle.

In this way, the routing system generates conditional customizable contraction hierarchies for vehicle navigation. For example, the routing system may construct a node-based graph from traffic data, and may generate, from the node-based graph, an edge-based graph that includes a prescribed vertex ordering and original road segments. The routing system may recognize additional road segments to preserve network interconnectivity while considering rank-based prioritization of links, may integrate these additional road segments with the original road segments to assemble CCH segments, and may calculate an arc configuration for each of the CCH segments. The routing system may generate a CCCH based on the CCH segments and the arc configurations, and may utilize the CCCH to provide navigational data to a vehicle. Thus, the routing system may conserve computing resources, networking resources, and/or other resources that would have otherwise been consumed by utilizing the time-consuming pre-processing stage to accommodate real-time road network changes, utilizing extensive searching and processing to establish cost-effective routes associated with conditional constraints, handling poor user experience associated with failing to provide accurate navigational routes that accommodate real-time road network changes, and/or the like.

FIGS. 1A-1J are diagrams of an example 100 associated with generating conditional customizable contraction hierarchies for vehicle navigation. As shown in FIGS. 1A-1J, example 100 includes a vehicle 105 associated with a routing system 110. The vehicle 105 may include a car, a truck, a motorcycle, a bus, a boat, farm equipment, construction equipment, among other examples. In some examples, the vehicle 105 may include an autonomous vehicle, a semiautonomous vehicle, or a non-autonomous vehicle. The routing system 110 may include a system that generates conditional customizable contraction hierarchies for vehicle navigation. Further details of the vehicle 105 and the routing system 110 are provided elsewhere herein. Although implementations described herein depict a single vehicle 105, in some implementations, the routing system 110 may be associated with multiple vehicles.

As shown in FIG. 1A, and by reference number 115, the routing system 110 may receive traffic data identifying roads and traffic in a geographical location associated with the vehicle 105. For example, the routing system 119 may receive the traffic data identifying the traffic and roads in the geographical location of the vehicle 105 from a third party source of such data (e.g., Google Maps, a traffic data source, a map data source, and/or the like). In some implementations, the traffic data received by the routing system 110 may also include historical traffic patterns, predictive traffic modeling, or user-reported traffic incidents and/or slowdowns. This additional traffic data may provide a more comprehensive view of potential travel conditions, allowing for more accurate routing predictions. Additionally, or alternatively, the traffic data may include parking data, if relevant, to assist in making final destination decisions for drivers seeking parking spots. Including parking data can be highly beneficial for urban areas where parking can significantly impact travel time.

As further shown in FIG. 1A, and by reference number 120, the routing system 110 may generate a node-based graph for the vehicle based on the traffic data. For example, based on the traffic data, the routing system 110 may generate a node-based graph that indicates interconnections of nodes and links and properties, such as surface times, speed limits, quantity of lanes, and/or the like. In some implementations, the node-based graph may include a sequence of links, where each link represents a segment of road. Each link may join a pair of nodes, referred to as a source node and a destination node. Nodes typically represent an intersection in the road, but may also be a point in the road where some properties change (e.g., a divider ending or a road entering a tunnel).

In some implementations, the routing system 110 may utilize an initial contraction hierarchy to create the node-based graph. A contraction hierarchy is a technique for restricting a set of links/roads that are followed to improve performance of routing queries while preserving optimal routes. A contraction hierarchy relies on the premise that most optimal road journeys follow an ascending-descending importance scheme that includes unimportant roads (e.g., side roads, roads with less lanes, and/or the like), followed by important roads, and followed by unimportant roads. During routing queries, if the routing system 110 limits a search to follow routes that adhere to the ascending-descending importance scheme, then a search space is dramatically reduced, making the search faster (e.g., because each node is expanded, which generates fewer child nodes that need to subsequently be expanded). The search will continue to find the optimal route in some cases, but in many cases will either find a suboptimal route, or will be unable to find a route as it would require traveling through links of lesser importance. This model may be modified to guarantee that the optimal route is always found by adding shortcuts that preserve the optimal routes under the ascending-descending importance scheme. A shortcut is a virtual link that represents traveling along multiple, less important roads, rather than just one as is the case with a normal link. This is a central idea of a contraction hierarchy.

A contraction hierarchy uses node importance, rather than link importance, but limits a routing search to find routes which initially follow links between nodes that monotonically increase in importance and then, at some point of the route, switches to following nodes that monotonically decrease in importance (e.g., priority). The contraction hierarchies described herein may include conditional contraction hierarchies, partitioned contraction hierarchies, and/or the like. The contraction hierarchy may replace a journey through unimportant roads with a shortcut. A precomputation stage of the contraction hierarchy may include adding all necessary shortcuts to preserve shortest paths between all nodes. An output of the precomputation stage may include data to be used for multiple routing queries. The precomputation stage begins with a full road network, and on each iteration, the lowest priority node that remains in the network is contracted. Contracting a node removes the node from the remaining network, because the node has a lower priority than every other node and, according to the importance scheme, the node is invisible to all remaining nodes. To make up for node contraction, the precomputation stage adds some shortcuts to preserve optimality. The lowest priority node may be determined according to a heuristic. The iteration continues until all nodes have been contracted. An output of this procedure is a contraction hierarchy, which is a road network augmented with priorities assigned to each node and shortcuts added to maintain optimality.

A query stage may occur after the precomputation stage. In the query stage, an optimal path is found using bidirectional search. The query stage may include expanding forward from an origin location, expanding backward from a destination location, and only traversing towards nodes of higher priority. A candidate path may be found whenever the two searches meet. The query stage may output a lowest-cost candidate, as that is the optimal solution.

During the query stage, the routing system 110 may identify a best route to be the route with a lowest cost, which is usually based on travel time, but may be augmented with constraints restricting the behavior of certain road users and routes. Such constraints may affect single links (e.g., link constraints, such as a road closed due to road works), turns from one link to another (e.g., turn constraints, such as a prohibited right turn), or a sequence of three or more links (e.g., multilink constraints, such as prohibiting a particular maneuver on a complex intersection).

A link, a turn, or a multilink maneuver may incur a cost, such as a base cost or a conditional cost set. The base cost may include a numerical value that relates strongly to a travel time of a link or a turn but may factor in road surface, traffic, driver preferences, and/or the like. The highest base cost values may be reserved for prohibition costs, whereby it is impossible to achieve a cost more expensive than a prohibition cost by accumulating any amount of non-prohibitive cost. The conditional cost set may include a set of pairs of a condition and a cost. Examples of conditions may include "vehicle height less than A," "carrying no hazardous materials," or "not customer XYZ." Conditions may include multiple clauses (e.g., "vehicle weight less than X tons or number of axles greater than Y"). Each condition may be associated with a cost penalty that will be incurred in addition to the base cost if the condition is violated. A conditional cost set may be empty when there are no special conditions for a link, a turn, or a maneuver.

Figure 1B:
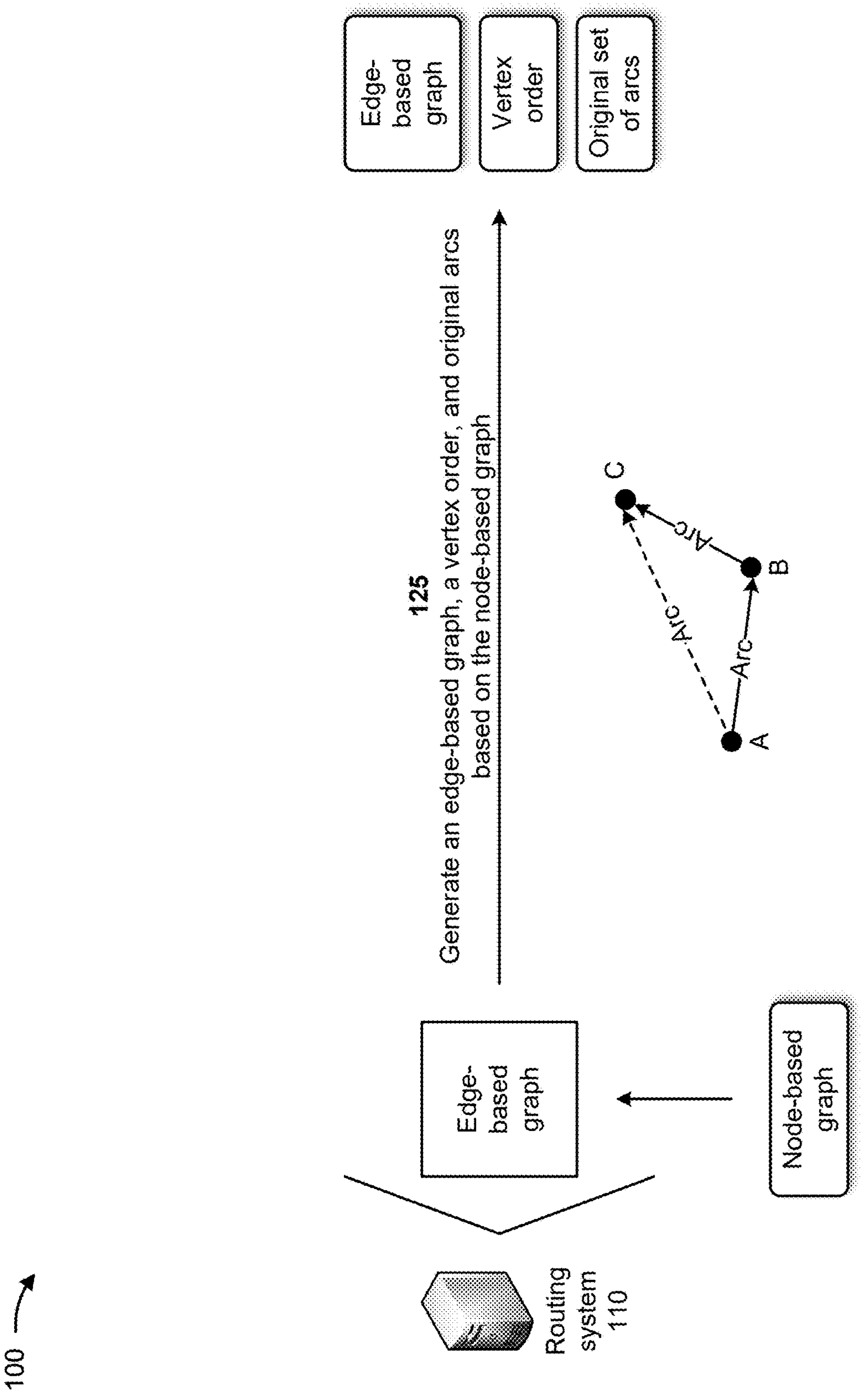

As shown in FIG. 1B, and by reference number 125, the routing system 110 may generate an edge-based graph, a vertex order, and original arcs based on the node-based graph. For example, the routing system 110 may transform the node-based graph (e.g., with nodes representing intersections and links representing road segments) into the edge-based graph that enables translation of the road segments to vertices and traversal between the road segments through arcs. This may include determination of the vertex order necessary for efficient search and navigation operations within the edge-based graph, and formation of original arcs that directly correspond to comprehensible paths from a source to a destination across transitioned segments. Each of the original arcs may include a combination of a source link and a turn onto a target link.

In generating the edge-based graph, the routing system 110 may identify and categorize road segments as vertices, and subsequently identify viable paths delineated as arcs and which a navigational query may utilize to move from one vertex to another vertex. The vertex order produced during this process may impose a structure facilitating search models, such as Dijkstra's, to determine optimal paths with considerations of variables, such as travel time, cost, or specific route constraints, relayed through conditional costs. Thereafter, the routing system 110 may compile the original arcs within the edge-based graph, representing direct and permissible paths that meet specific criteria, such as allowable turns and roadway designations. The original arcs may provide the groundwork for further computational steps which may include identifying additional arcs necessary for complete network traversal, respecting a determined link priority ordering of the vertex order. Additionally, or alternatively, the routing system 110 may identify the original arcs using a model that prioritizes links with higher traffic flow or greater strategic importance within the road network. Such a model may enable the routing system 110 to focus on arcs that are most critical for maintaining efficient traffic flow, thereby optimizing the mapping and navigation experience for users.

In some implementations, the routing system 110 may generate the vertex order based on a metric-independent ordering that uses inertial flow partitioning of links in the node-based graph. This may provide adaptability to various cost models while minimizing preprocessing time required for the routing system 110 to accommodate diverse vehicular parameters and preferences. Additionally, or alternatively, the routing system 110 may create the vertex order based on a method, such as metric-independent ordering that uses seed-based partitioning of links in the node-based graph.

Figure 1C:
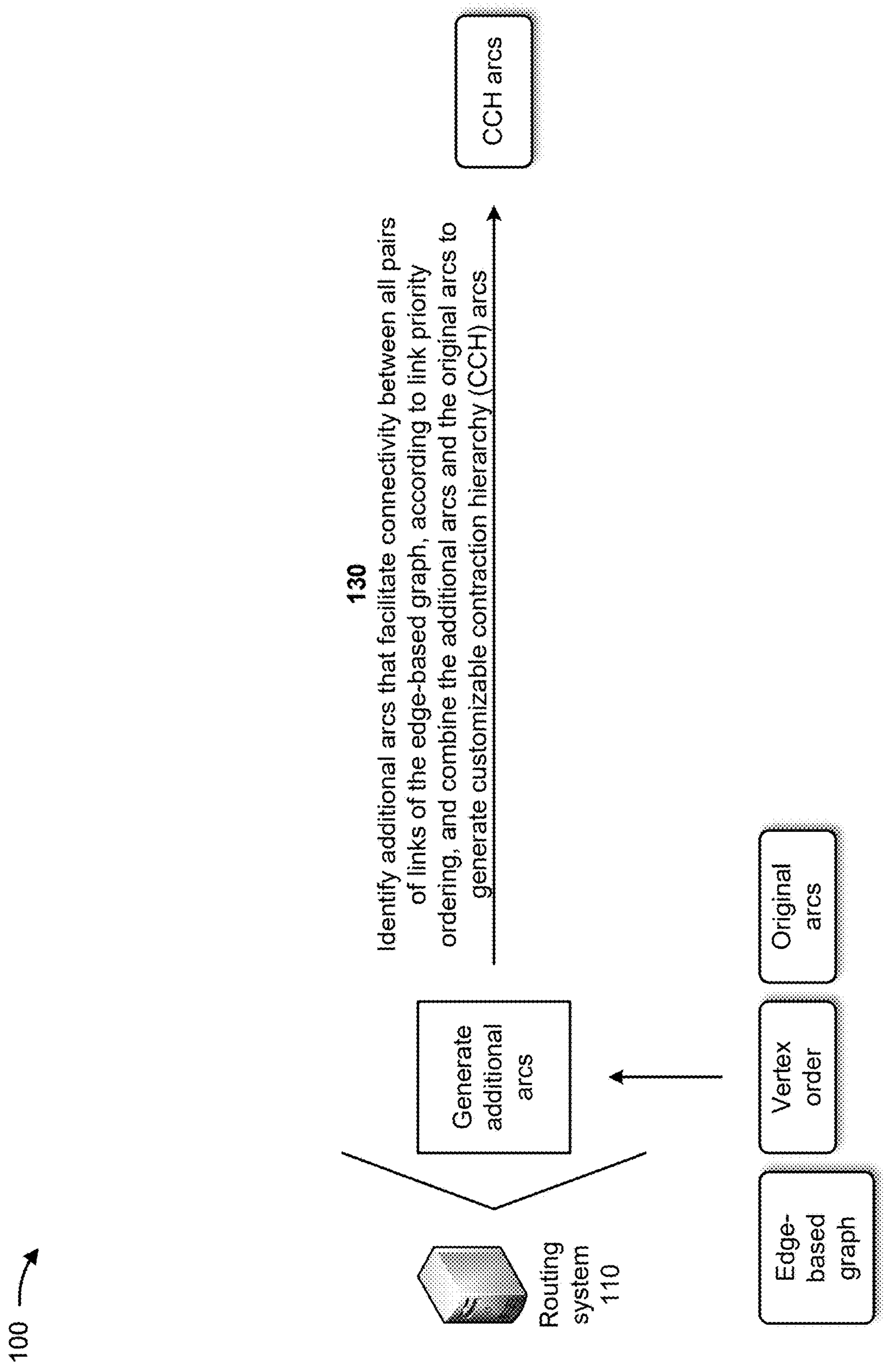

As shown in FIG. 1C, and by reference number 130, the routing system 110 may identify additional arcs that facilitate connectivity between all pairs of links of the edge-based graph, according to link priority ordering, and may combine the additional arcs and the original arcs to generate CCH arcs. For example, the routing system 110 may analyze the edge-based graph to determine where connectivity between links (e.g., represented by vertices in the edge-based graph) need to be improved to facilitate routing. The link priority ordering may establish an order in which links (or their corresponding vertices in the edge-based graph) are prioritized by the routing system 110 for pathfinding purposes. Links with higher priority may include major roads or highways that are preferentially utilized in route calculations. The link priority ordering may be the same as the vertex order since vertices in the link-based graph are links in the node-based graph. Route calculations may not preferentially use higher priority links, but the vertex order may require that the forward and backward searches only traverse arcs that move to higher priority vertices as per an increasing-then-decreasing pattern.

In some implementations, the routing system 110 may utilize a machine learning model to determine optimal connectivity patterns within the edge-based graph, and to identify the additional arcs based on the optimal connectivity patterns. With regard to connectivity, the routing system 110 may ensure that for any pair of vertices S and T where T can be reached from S in an underlying graph (i.e., without needing to obey the vertex order), T must still be reachable from S when obeying the vertex order. Thus, the routing system 110 may create extra arcs that bridge decreasing-then-increasing priority transitions, as these violate the vertex order. Without such arcs it would be impossible to route from some source vertices to some target vertices, thus reducing the connectivity of the graph when the vertex order is enforced.

Additionally, or alternatively, the routing system 110 may utilize historical routing data when identifying the additional arcs to anticipate and address frequently encountered connectivity issues in the edge-based graph. In some implementations, the routing system 110 may selectively identify additional arcs only in areas of the edge-based graph known to have complex routing challenges, such as urban centers or areas with frequent construction. This may enable the routing system 110 to target areas where enhanced connectivity will have the most significant impact on route optimization. Additionally, or alternatively, the routing system 110 may utilize a hierarchical clustering approach to group links within the edge-based graph before determining the additional arcs required for effective connectivity. By grouping links, the routing system 110 may simplify the complexity of the edge-based graph and may identify underlying patterns in connectivity that facilitate the identification of the additional arcs.

Once the additional arcs are identified by the routing system 110, the additional arcs may be combined with the original arcs of the edge-based graph to generate the CCH arcs. The original arcs directly correlate to specific connections, such as turns, between road segments. Whereas, the additional arcs ensure that connectivity does not rely on traversing lower-priority elements, which is not allowed. The CCH arcs may enable routing that adheres to a hierarchical structure where a route progress from lower to higher priority links and then back down as the route approaches a destination. The CCH arcs may provide full connectivity across a road network while respecting the priority of links, and may facilitate efficient and flexible routing for a variety of vehicle-specific parameters and preferences.

Figure 1D:
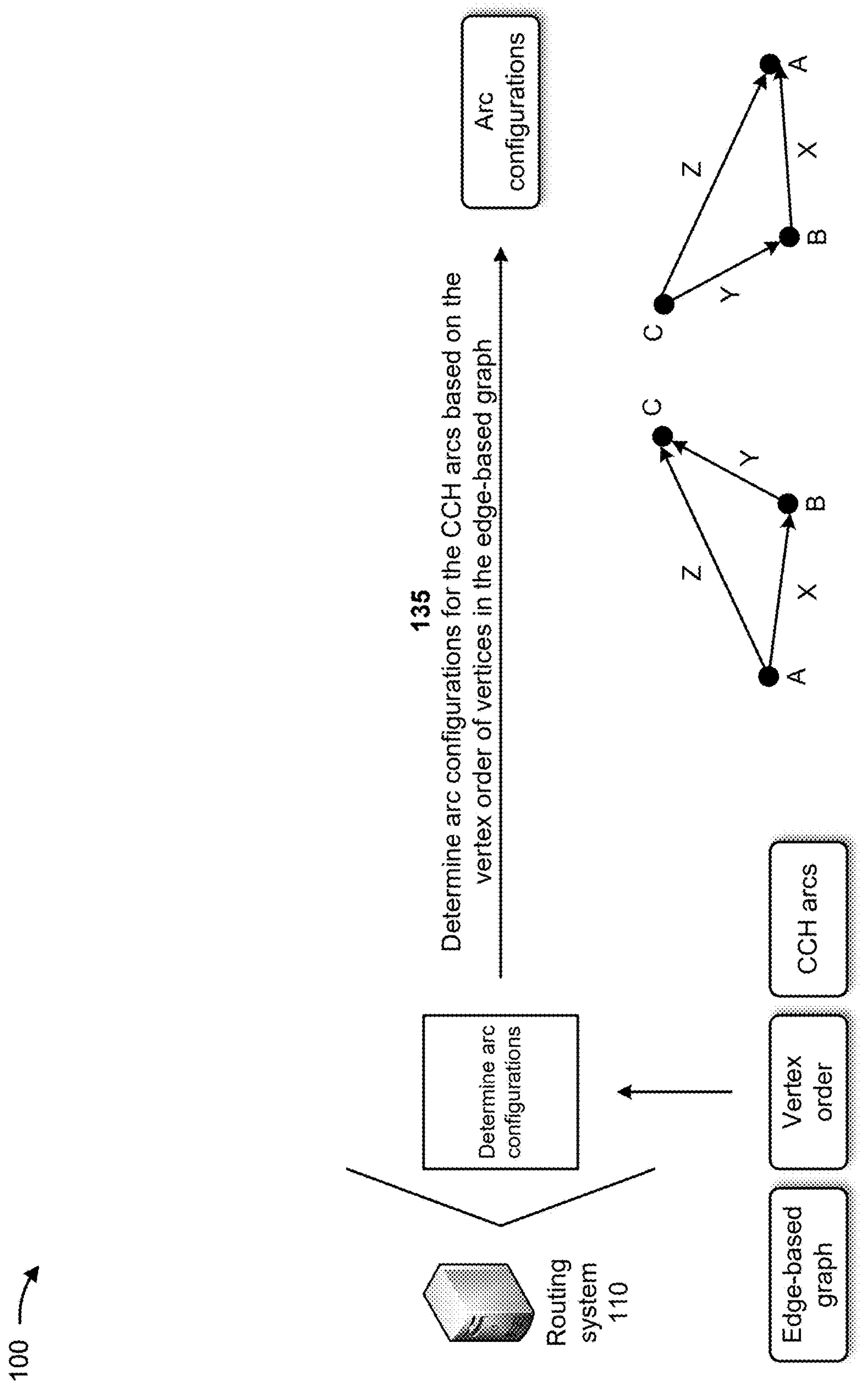

As shown in FIG. 1D, and by reference number 135, the routing system 110 may determine arc configurations for the CCH arcs based on the vertex order of vertices in the edge-based graph. For example, an arc from a first vertex to a second vertex may utilize several different paths, some of which are optimal under certain conditions. An arc configuration may denote a single path and may include information about its child arcs and a cost. An arc configuration corresponding to an original arc may have no child arc configurations. Instead, an original arc may directly correspond to a specific combination of a source link, and a turn onto a destination link. All other arc configurations may include two child arc configurations (e.g., X and Y in FIG. 1D), coming from two lower branches of a triangle, where relative heights of the arc configurations represent relative vertex priorities.

In some implementations, determining the arc configurations may include the routing system 110 evaluating multiple routes from a vertex to another vertex while considering specific vehicle parameters and geographic features. This may enable the routing system 110 to account for a multitude of possible scenarios and conditions that could impact traversal of the vehicle 105 through the road network. For example, the routing system 110 may assess different path options taking into account fuel efficiency, steepness of roads, and road closures due to weather conditions. Additionally, or alternatively, determining the arc configurations may include the routing system 110 identifying optimal paths based on a combination of constraints related to vehicle size, cargo restrictions, and road conditions. Additionally, or alternatively, the routing system 110 may create a tree (e.g., a binary tree) of arc configurations to map out a detailed path between two points in the road network. This tree approach may simplify a decoding process of the routing path by providing clear parent-child relationships between the arcs, thus making it easier to reconstruct the complete trajectory from origin to destination.

The routing system 110 may calculate a cost associated with each arc configuration using a cost model sensitive to conditional constraints. These constraints may include dynamic factors, such as time-of-day traffic patterns, or static factors, such as toll roads. Furthermore, the routing system 110 may update the arc configurations in response to real-time traffic data or changes in road network conditions. This real-time responsiveness may ensure that routing recommendations remain relevant and executable. Moreover, the routing system 110 may utilize an iterative model to progressively refine the arc configurations by comparing various path combinations and cost implications. This iterative approach may ensure incremental improvements in route accuracy and efficiency with each calculation cycle.

With reference to the example triangles shown in FIG. 1D, the routing system 110 may finalize costs for all upward arcs Z incoming to or outgoing from a vertex A (e.g., arcs whose opposite vertex C has a higher priority than vertex A). By iterating over vertices in priority order, the routing system 110 may ensure that all of the lower arcs in a triangle have already been finalized by the time the routing system 110 finalizes arc Z. The routing system 110 only needs to iterate over all pairs of arcs X and Y that form a triangle from vertex A to vertex C. This may enable the routing system 110 to make customizations faster than traditional contraction hierarchies, which require a witness search to be carried out.

Figure 1E:
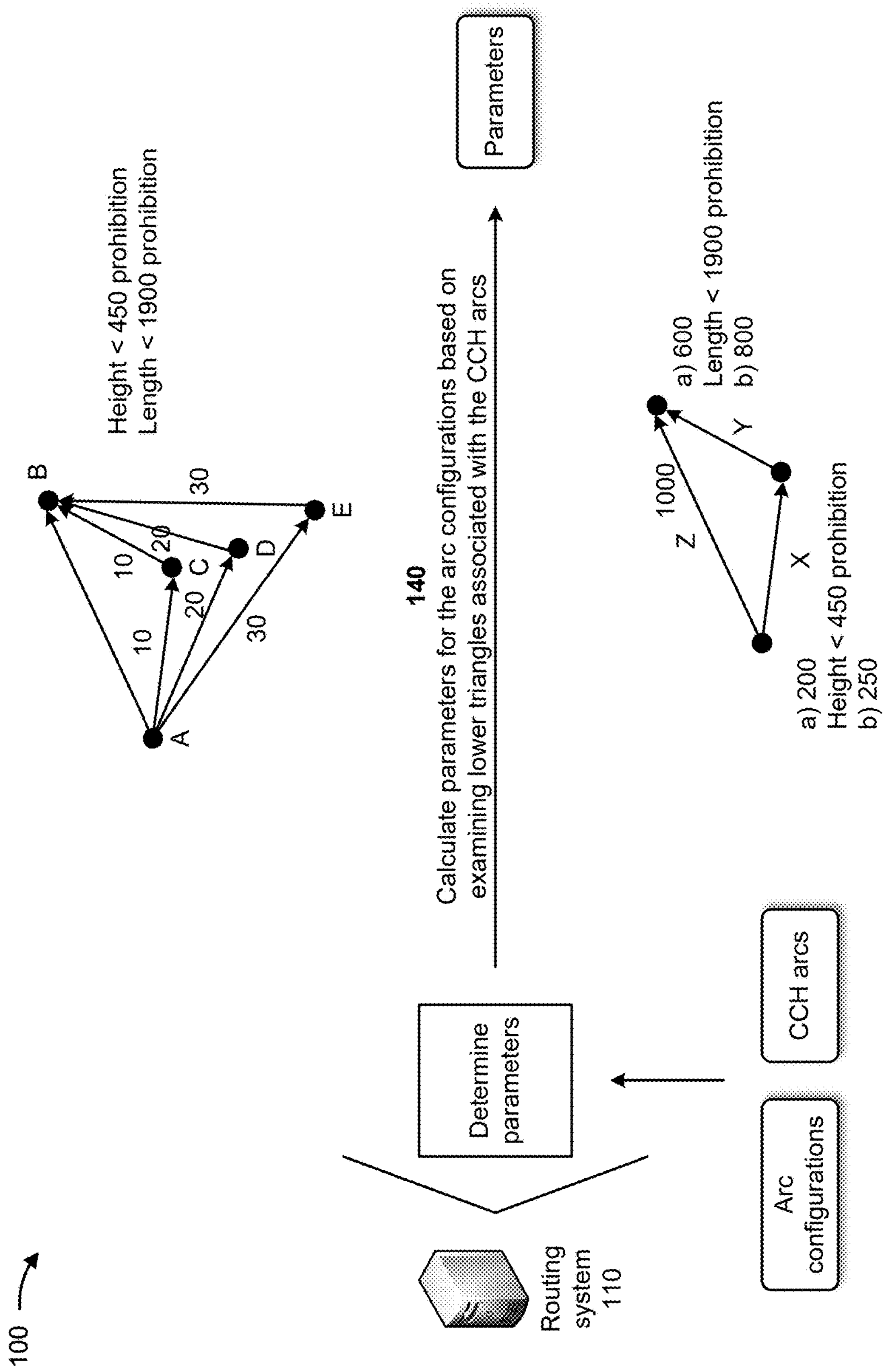

As shown in FIG. 1E, and by reference number 140, the routing system 110 may calculate parameters for the arc configurations based on examining lower triangles associated with the CCH arcs. For example, the routing system 110 may review combinations of potential paths represented by "lower triangles" in the edge-based graph. These lower triangles may include formations in the edge-based graph where a path from one vertex to another can transit through vertices of lower priority, which may provide a more cost-effective route despite initially seeming counterintuitive. For instance, a direct route may be more costly compared to a two-step route passing through an intermediate, lower priority vertex. The routing system 110 may consider multiple potential lower triangle paths, each represented by a pair of CCH arcs, to calculate the composite parameters for the resultant arc configurations. In some implementations, the parameters for the arc configurations may include paths of the CCH arcs, costs of the CCH arcs (e.g., base costs and conditional costs), distances associated with the CCH arcs, travel durations associated with the CCH arcs, conditions associated with the CCH arcs, and/or the like.

By comprehensively evaluating the lower triangle combinations, the routing system 110 may determine parameters that encapsulate details, such as a base cost of traversal and any conditional costs applicable due to specific vehicle parameters or road attributes. As a result, the routing system 110 can filter and select the most appropriate arc configurations, ensuring that the paths recommended to the vehicle 105 are not only optimal in terms of primary cost considerations but also in accordance with any additional site-specific or vehicle-specific constraints.

In some implementations, the routing system 110 may iterate over vertices of the lower triangles based on the vertex order to calculate the parameters for the arc configurations. The iterative process may utilize the vertex order to methodically evaluate each lower triangle permutation, providing a thorough examination of possible routes and their associated costs. By prioritizing vertices and examining them in sequence, the routing system 110 may efficiently determine the most advantageous configurations that meet a predefined criteria, such as minimizing travel time or cost. Additionally, or alternatively, the routing system 110 may receive updated traffic data identifying updated traffic associated with the roads and may dynamically update the parameters for the arc configurations based on the new traffic data. This may ensure that the routing system 110 remains responsive to changes in the road network conditions, such as road closures or traffic congestion.

Additionally, or alternatively, the routing system 110 may utilize conditional constraints associated with features of the vehicle 105, the roads, and the current traffic conditions to determine the parameters for the arc configurations. Additionally, or alternatively, the routing system 110 may implement a cost model that considers various factors, such as the path of one of the CCH arcs, a cost relative to a specific condition, or a combination of a base cost and a conditional cost, during determination of the parameters for arc configurations.

As shown in a top example of FIG. 1E, an arc A-B may be associated with three lower triangles A-C-B, A-D-B, and A-E-B. Each lower triangle may have a different cost, and some lower triangles may have a non-empty conditional cost set. Combining the costs and conditional cost sets of the pairs of arcs may indicate that triangle A-C-B has a total cost of 20 (10+10), plus a prohibition for vehicles taller than 450 centimeters (cm); triangle A-D-B has a total cost of 40 (20+20), plus a prohibition for vehicles longer than 1900 cm; and triangle A-E-B has a total cost of 60 (30+30) with no prohibitions. There are circumstances under which each of these triangles may be the optimal path from A to B: a vehicle with height less than 450 cm will only incur a cost of 20 for A-C-B, so this is optimal; a vehicle taller than 450 cm but with a length less than 1900 cm will incur a cost of 20 plus a prohibition for A-C-B, but only a cost of 40 for A-D-B, so A-D-B is optimal; or a vehicle taller than 450 cm and longer than 1900 cm will incur a cost of 20 plus a prohibition for A-C-B, a cost of 40 plus a prohibition for A-D-B, and a cost of 60 for A-E-B, so A-E-B is optimal. As a result, the arc A-B may include three configurations: children AC and CB, with a cost of 20, plus a prohibition for vehicles taller than 450 cm; children AD and DB, with a cost of 40, plus a prohibition for vehicles longer than 1900 cm; and children AE and EB, with a cost of 60 and no prohibitions. The list of arc configurations may be sorted in increasing order according to the base cost.

As shown in a bottom example of FIG. 1E, a lower triangle with lower arcs may have multiple arc configurations. In this example, arc Z may have an arc configuration with a cost of 1000 and no conditional costs (either from an original arc, or a different lower triangle). The two lower arcs X and Y each have two arc configurations, an arc configuration (a) with a lower base cost and a condition, and another arc configuration (b) with a higher base cost and no condition. All pairs of the arc configurations of X and Y may be enumerated to determine the necessary arc configurations for Z: X(a) with Y(a) gives us a base cost of 800 with a height condition and a length condition; X(a) with Y(b) gives a base cost of 1000 with a height condition; X(b) with Y(a) gives a base cost of 850 with a length condition; and X(b) with Y(b) gives a base cost of 1050 with no conditions.

From this set of possible arc configurations, the routing system 110 may identify an arc configuration to keep for arc Z by comparing pairs of possible configurations to determine if one configuration cannot be cheaper than the other configuration under any circumstances. For example, if configuration A cannot be cheaper than configuration B, and configuration B cannot be cheaper than configuration C, then configuration A cannot be cheaper than configuration C.

The routing system 110 may utilize this transitive assumption to eliminate redundant configurations. For this example, an initial configuration, with a base cost of 1000 and no conditions may be a starting point. X(a) with Y(a) may be cheaper than 1000 as the base cost is 800, but its height and length conditions mean it may not be cheaper than 1000. Therefore, this combination may be retained but cannot eliminate the initial configuration. X(a) with Y(b) has a base cost equal to the initial configuration, with additional conditions meaning it could be more expensive. Therefore, this combination cannot be cheaper than the initial configuration and is redundant. X(b) with Y(a) may be cheaper than 1000 as the base cost is 850, but it also has a conditional cost. The base cost is higher than that of X(a) with Y(a), but the latter has an additional condition that could make it more expensive than X(b) with Y(a). Therefore, this combination may be retained but cannot eliminate the initial configuration or X(a) with Y(a). X(b) with Y(b) has a base cost higher than the base cost of the initial configuration, which also has no conditions. Therefore, this combination is redundant. The arc Z may end up with the following configurations: children X(a) and Y(a) with 800 base cost, a height condition, and a length condition; children X(b) and Y(a) with 850 base cost and a length condition; and no children with 1000 base cost and no conditions.

Figure 1F:
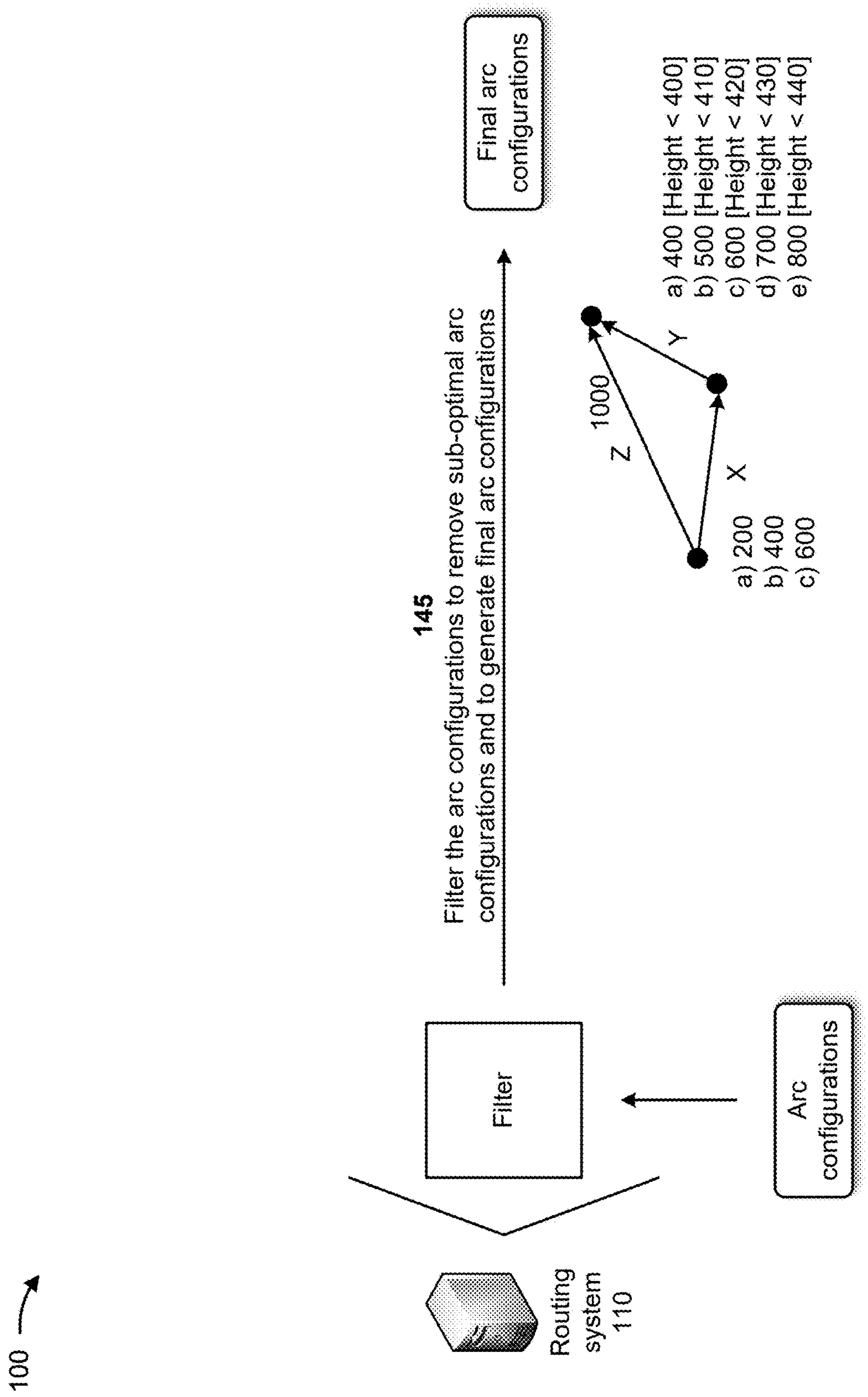

As shown in FIG. 1F, and by reference number 145, the routing system 110 may filter the arc configurations to remove sub-optimal arc configurations and to generate final arc configurations. For example, an arc may be associated with tens or even hundreds of distinct arc configurations due to having incomparable conditions. Since all pairs of arc configurations between two lower arcs of a triangle need to examined, this may result in tens of thousands of potential arc configurations needing to be examined by the routing system 110 (e.g., even though most of these arc configurations may be sub-optimal and therefore discarded). The routing system 110 may sort the arc configurations based on the base costs of the arc configurations to reduce the quantity of potential arc configurations that need to be examined by the routing system 110.

In some implementations, the routing system 110 may filter the arc configurations by assessing the arc configurations, each with a base cost and associated conditional costs or constraints tied to specific vehicle parameters, such as height, length, vehicle weight, axle count, or presence of hazardous materials. In some implementations, the routing system 110 may utilize an iterative method to compare a base cost of each arc configuration against previously determined base costs for other arc configurations, and to discard arc configurations with base costs that exceed a defined threshold relative to characteristics of the vehicle 105. This iterative approach may enhance a decision-making process for the routing system 110, allowing for systematic elimination of arc configurations. Additionally, or alternatively, the routing system 110 may utilize a priority queue model to efficiently process and rank the arc configurations, prioritizing the arc configurations based on a combination of base and conditional costs for rapid elimination of sub-optimal arc configurations. The efficient sorting and ranking mechanism inherent in a priority queue model may greatly accelerate the filtering process, ensuring that optimal arc configurations are rapidly brought to the forefront for consideration.

Furthermore, the routing system 110 may utilize a machine learning model, historical routing data, and real-time updates, to filter the arc configurations to remove sub-optimal arc configurations. This may enable the routing system 110 to adaptively learn from past routing successes and incorporate live data inputs, such as traffic or road condition changes, to anticipate the most favorable routes preemptively. Additionally, the routing system 110 may utilize vehicle-specific profiles, which include predefined parameters and constraints that automatically filter out incompatible arc configurations. Additionally, the routing system 110 may utilize a heuristic-based filtering approach, where arc configurations are assessed based on heuristic scores that consider factors like traffic patterns, road closures, or weather conditions, in addition to base and conditional costs. Additionally, as part of the filtering process, the routing system 110 may consider alternative metrics like fuel efficiency or toll costs for commercial vehicles to generate final arc configurations that optimize for cost savings. The arc configurations that remain after the filtering process constitute the final arc configurations.

As shown in an example of FIG. 1F, a lower triangle may have fifteen distinct combinations of arc configurations for lower arcs. Each of the three arc configurations of arc X may have a distinct conditional cost set. Since there are three arc configurations of arc X and five arc configurations of arc Y, the routing system 110 would need to examine fifteen (e.g., 3×5=15) configurations of arc Z to determine which arc configurations to keep. The routing system 110 may reduce this quantity by determining an optimistic conditional cost set (CCS) for the arc configurations of both arc X and arc Y. The optimistic CCS may be as restrictive as possible while not being more restrictive than any CCS of any individual arc configuration of the given arc. For example, all configurations of arc Y have a height condition of varying value, and the least restrictive of these is height<440 on configuration (e). Thus, the optimistic CCS of arc Y is height<440.

The routing system 110 may loop through pairs of arc configurations x of arc X, and y of arc Y, ordered first by a base cost of x and then by a base cost of y. A sum of the base costs of x and y, combined with the actual conditional cost set of x and the optimistic conditional cost set for arc Y, form an underestimate of the cost and conditions for any subsequent configuration that could be formed with x. If this underestimate cannot be cheaper than some existing configuration of Z, the routing system 110 may cease examining configurations involving x. Similarly, the base costs of x and y, combined with the actual conditional cost set of y and the optimistic conditional cost set for arc X, form an underestimate of the cost and conditions for any subsequent configuration that could be formed with y.

To illustrate these steps with the above example, the routing system 110 may start by pairing each of the configurations of arc Y with X(a) (e.g., no filtering is possible), and may examine X(b) with Y(a), and Y(b) (e.g., no filtering is possible). When examining X(b) with Y(c), the routing system 110 may determine that a total cost of 1000 with the conditions from Y(c) cannot be cheaper than the existing configuration with cost 1000 and no conditions, so the routing system 110 may skip any remaining configurations involving Y(c). The routing system 110 may determine that the total cost of 1000 with the optimistic conditional cost set for arc Y also cannot be cheaper than the existing configuration with cost 1000 and no conditions, so the routing system 110 may skip any remaining configurations involving X(b). The same filtering occurs when examining X(c) with Y(a), so no combinations involving X(c) are ultimately examined. With these techniques, the routing system 110 may examine a total of seven combinations out of a maximum of fifteen.

Figure 1G:
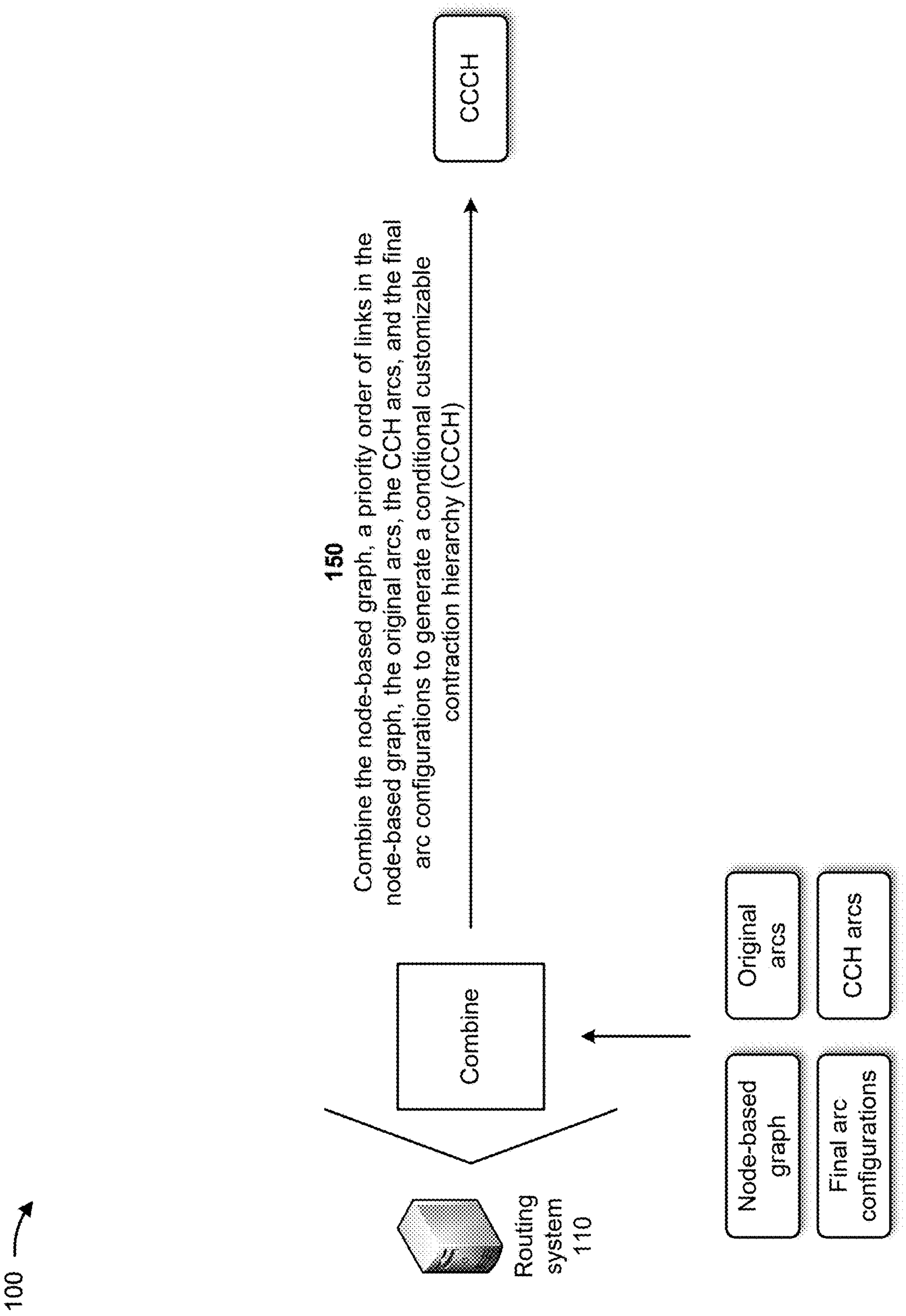

As shown in FIG. 1G, and by reference number 150, the routing system 110 may combine the node-based graph, a priority order of links in the node-based graph, the original arcs, the CCH arcs, and the final arc configurations to generate a CCCH. For example, the routing system 110 may integrate various components of the road network to construct the CCCH. The routing system 110 may utilize the relationship between the node-based graph, which includes nodes representing intersections and links representing road segments, and the priority order that signifies the hierarchical structure of the road network when generating the CCCH. The routing system 110 may also utilize the original arcs, which reflect individual turning maneuvers from one link to another, the additional CCH arcs that ensure network connectivity while respecting the priority order, and the final arc configurations when generating the CCCH.

In some implementations, the routing system 110 may utilize a combination of the original arcs from the edge-based graph and the additional arcs to establish full connectivity across all pairs of links, following the designated link priority ordering and resulting in the formation of the CCH arcs within the CCCH. This comprehensive integration provides complete connectivity of the road network, ensuring that each link is accessible from every other link in accordance with the established hierarchy, thereby enhancing the quality and reliability of the routing data provided to the vehicle 105. Additionally, or alternatively, the routing system 110 may utilize the various parameters for each arc configuration (e.g., path specifics, cost implications, associated distances, travel durations, and any prevailing conditions that impact selected routes) when incorporating the final arc configurations into the CCCH. The arc configurations may provide for having multiple navigational paths between pairs of vertices in the edge-based graph. The routing system 110 may align the arc configurations with the overall hierarchy to facilitate efficient and accurate routing by recognizing optimal paths based on vehicle-specific parameters and roadway conditions.

The CCCH provides a data-rich structure that the routing system 110 may utilize for advanced navigational assistance tailored to the vehicle 105 and prevailing traffic conditions. The CCCH not only aids in generating routing data that is dynamically responsive to real-time vehicle parameters and geographic changes but also enables the routing system 110 to deliver these insights directly to the vehicle 105. Additionally, or alternatively, in the event of updates to the road network or changes in the traffic data, the routing system 110 may adjust the CCCH accordingly, recalculating and optimizing the arc configurations to maintain accurate and optimized routing for the vehicle 105. This inherent flexibility may ensure that any modifications in the road layout or traffic flow are promptly reflected in the CCCH.

Figure 1H:
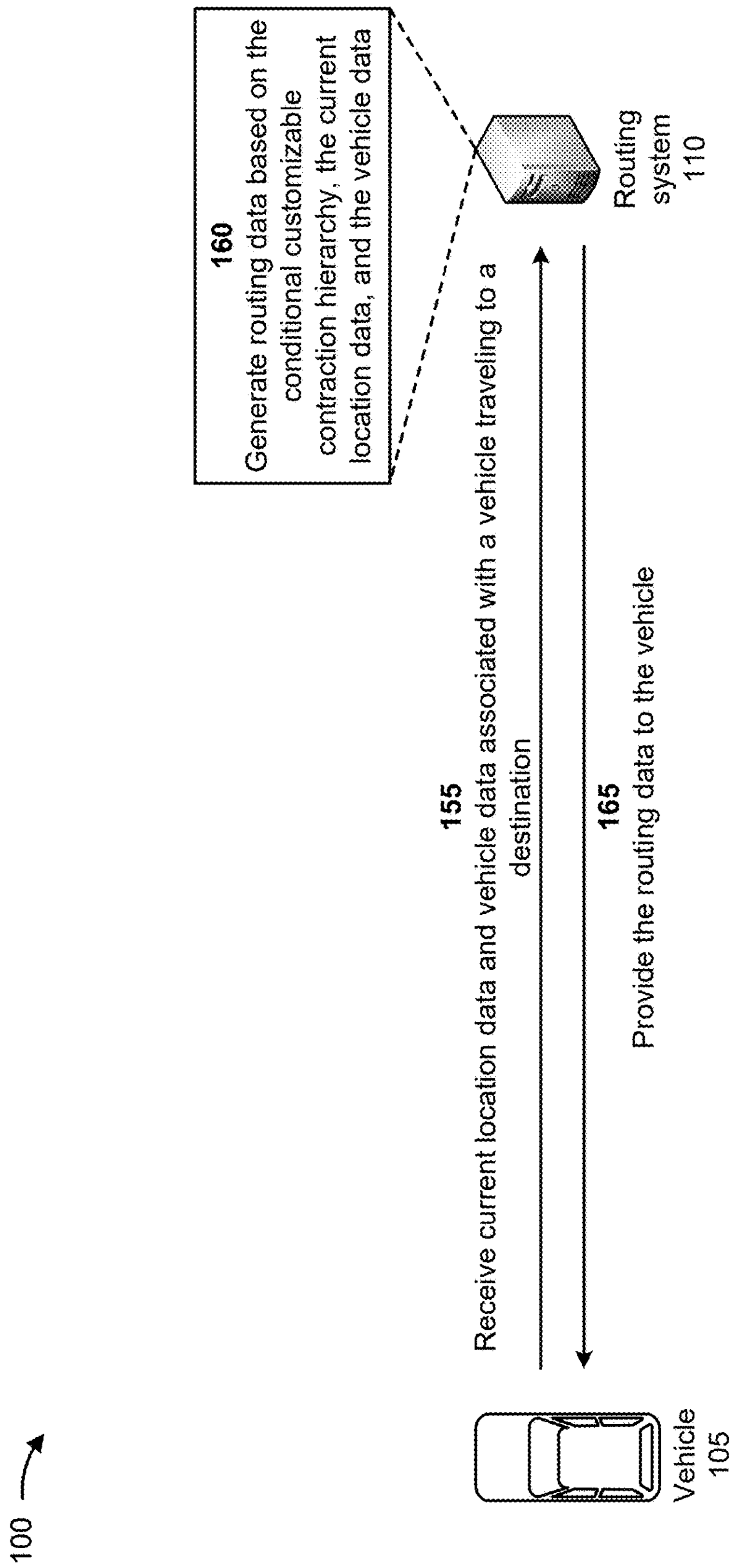

As shown in FIG. 1H, and by reference number 155, the routing system 110 may receive current location data and vehicle data associated with the vehicle 105 traveling to a destination. For example, the current location data may include data identifying a current geographical location of the vehicle 105, as generated by a global positioning system (GPS) device of the vehicle 105. The routing system 110 may receive the current location data from the GPS device of the vehicle 105. In some implementations, the current location data may include data derived from alternative positioning systems such as cell tower triangulation, Wi-Fi positioning systems, or other satellite navigation systems. These alternative positioning systems may provide robustness in location tracking by complementing or substituting for GPS in areas with weak satellite signals.

The vehicle data may include data received from a vehicle device, such as a telematics device, a video camera, a dashboard camera, an inertial measurement unit, a three-axis accelerometer, a gyroscope, the GPS device, an on-board diagnostics (OBD) device, a vehicle tracking unit, an electronic control unit (ECU), and/or the like. The vehicle data may include data identifying a speed of the vehicle 105, a direction of the vehicle 105, surroundings of the vehicle 105, and/or the like. Additionally, or alternatively, the vehicle data may include data received from additional sensory systems including proximity sensors, LIDAR, or radar systems of the vehicle 105. These supplemental sensory systems may enhance environmental awareness by providing more detailed information regarding surroundings, obstacles, and adjacent entities of the vehicle 105.

As further shown in FIG. 1H, and by reference number 160, the routing system 110 may generate routing data based on the CCCH. For example, the routing system 110 may utilize the CCCH to generate routing data identifying driving directions from a current location of the vehicle 105 to the destination location. The routing system 110 may utilize the CCCH to ascertain optimal routes for the vehicle 105 given a set of parameters (e.g., vehicle attributes, current traffic conditions, various constraints that can influence travel, and/or the like). When generating the routing data, the CCCH may select optimal paths, determine estimated travel times, and calculate any applicable restrictions, such as restrictions arising from multilink constraints or vehicle-specific condition checks.

In some implementations, when generating the routing data based on the CCCH, the routing system 110 may account for conditional cost evaluations to offer dynamic routing options based on real-time data. This may enable the routing system 110 to dynamically adjust the routing data as traffic conditions evolve, thereby offering the most current and optimized routing data to the vehicle 105. Additionally, or alternatively, when generating the routing data based on the CCCH, the routing system 110 may utilize bidirectional Dijkstra search methods to process the routing data before providing the routing data to the vehicle 105.

As further shown in FIG. 1H, and by reference number 165, the routing system 110 may provide the routing data to the vehicle 105. For example, the routing system 110 may provide the routing data to the vehicle 105, and the vehicle 105 may receive the routing data. The vehicle 105 and/or a driver of the vehicle 105 may utilize the routing data for traveling to the destination location. In some implementations, the routing system 110 may provide the routing data to the vehicle 105 via a digital communication network, a wireless transmission, or other suitable methods of data exchange, ensuring that the vehicle 105 receives accurate and timely routing data for navigation. The routing data may be optimized not only based on the CCCH but also based on predefined driver preferences and historical traffic patterns, leveraging machine learning models for enhanced route prediction accuracy, thereby offering a more personalized navigation experience.

Figure 1I:
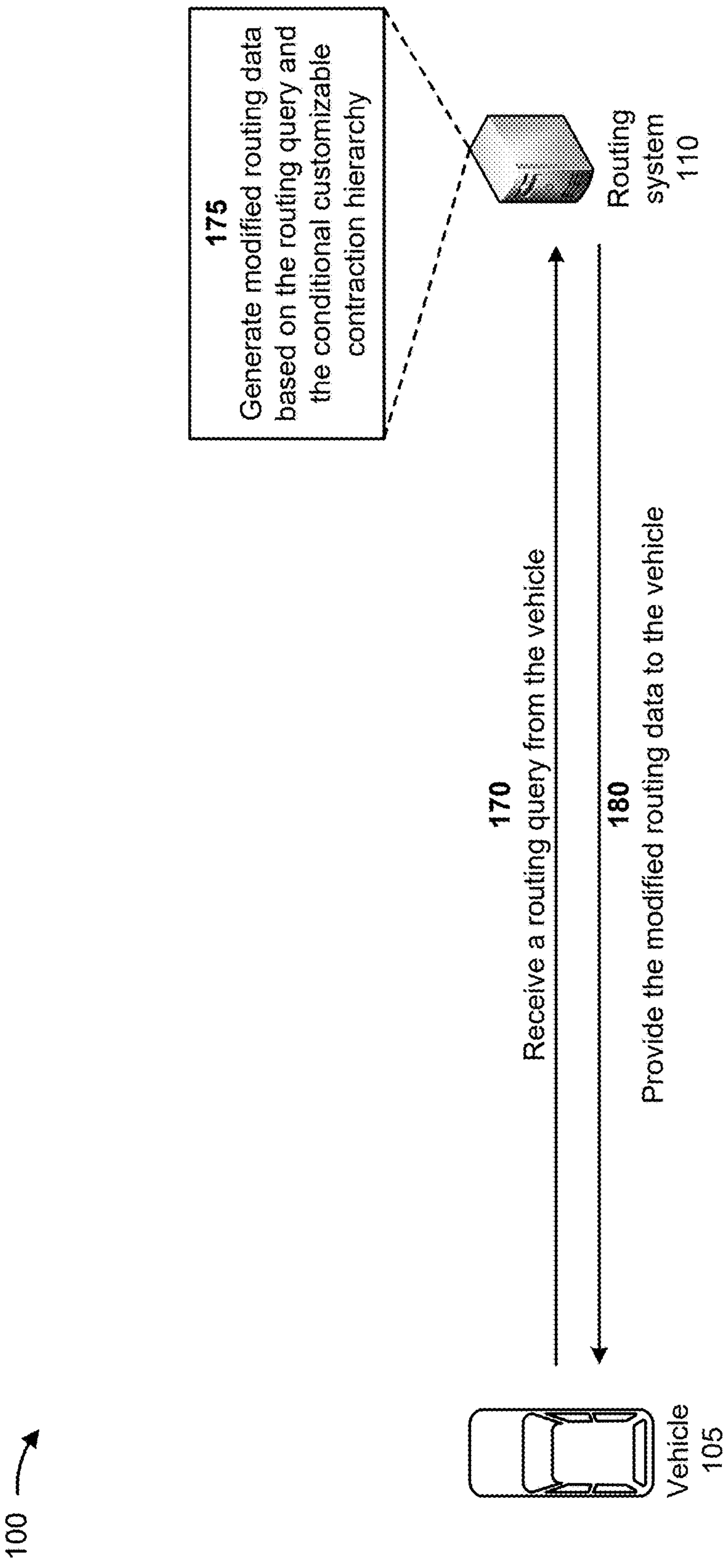

As shown in FIG. 1I, and by reference number 170, the routing system 110 may receive a routing query from the vehicle 105. For example, the routing system 110 may receive a request for navigation assistance (e.g., the routing query) from the vehicle 105. The request may include data pertaining to the current location of the vehicle 105 and desired destination details. The system responsible for generating the routing query may include an onboard device of the vehicle 105 or may be a network-based routing service that communicates with the vehicle 105 through wireless technology. Additionally, or alternatively, the vehicle 105 may utilize a remote server for generating the routing data.

As further shown in FIG. 1I, and by reference number 175, the routing system 110 may generate modified routing data based on the routing query and the CCCH. For example, based on the routing query, the routing system 110 may utilize the CCCH to compute an optimal route for the vehicle 105, which includes real-time and stored modified routing data regarding traffic conditions, road constraints, and vehicle characteristics. The routing system 110 may analyze the routing query in conjunction with the CCCH to accommodate any real-time updates or specific vehicle requirements. Additionally, or alternatively, the routing system 110 may apply a combination of the CCCH and a predictive model when generating the modified routing data. Utilizing historical traffic patterns and environmental factors such as weather, the predictive model may enhance the accuracy of the modified routing data. Furthermore, the routing system 110 may generate modified routing data by employing a hybrid approach that integrates the CCCH with inputs from dynamic traffic management systems (e.g., receiving real-time data from roadside infrastructure) to generate a coherent, optimized routing strategy.

In some implementations, the routing system 110 may utilize a bidirectional Dijkstra search restricted to arcs moving upward in priority or an elimination tree when processing the routing query and generating the modified routing data. The routing system 110 may determine which arc configuration to use for any given arc during utilization of the bidirectional Dijkstra search or the elimination tree. The exact parameters of the vehicle 105 are known at query time, so for a given arc, the routing system 110 may determine which of its arc configurations is optimal. For example, the routing system 110 may iterate through the arc configurations in order (e.g., stored in increasing order of base cost), and, for each configuration, may determine an actual cost (e.g., including costs from any conditions). The routing system 110 may store a best-so-far seen arc configuration cost, and if the next arc configuration's base cost is higher than the best-so-far cost, the routing system 110 may stop iterating.

Take for example an arc Z with the following configurations: (A) X(a)+Y(a), with 800 base cost, a height condition, and a length condition; (B) X(b)+Y(a) with 850 base cost and length condition; and (C) an initial configuration with 1000 base cost and no conditions. For a vehicle 105 with height less than 450 cm and length less than 1900 cm, configuration A results in a cost of 800, configuration B's base cost is higher than 850, so the routing system 110 may stop iterating and return configuration A. For a vehicle 105 with length greater than 1900 cm, configuration A results in a cost of 800 and a prohibition, configuration B results in a cost of 850 and a prohibition, and configuration C results in a cost of 1000, so the routing system 110 may return configuration C.

As further shown in FIG. 1I, and by reference number 180, the routing system 110 may provide the modified routing data to the vehicle 105. For example, the routing system 110 may provide the modified routing data to the vehicle 105, and the vehicle 105 may receive the modified routing data. The vehicle 105 and/or a driver of the vehicle 105 may utilize the modified routing data for traveling to the destination location. In some implementations, the routing system 110 may provide the modified routing data to the vehicle 105 via a digital communication network, a wireless transmission, or other suitable methods of data exchange, ensuring that the vehicle 105 receives accurate and timely modified routing data for navigation.

Figure 1J:
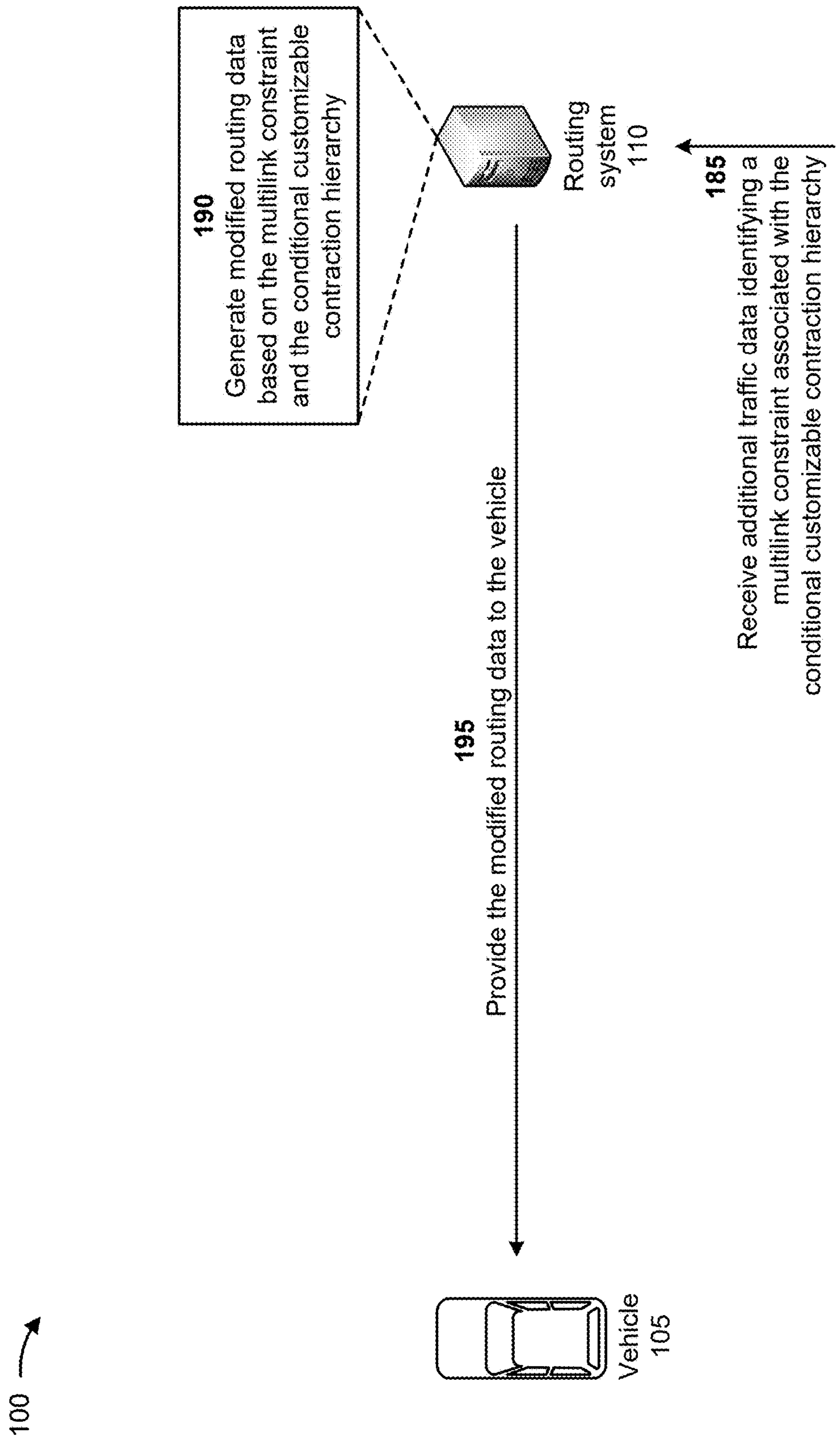

As shown in FIG. 1J, and by reference number 185, the routing system 110 may receive additional traffic data identifying a multilink constraint associated with the CCCH. For example, the routing system 110 may receive the additional traffic data identifying the multilink constraint associated with the CCCH from a third party source of such data (e.g., Google Maps, a traffic data source, a map data source, and/or the like). Many restrictions to routing maneuvers cannot be modeled by a single link or turn constraint and must instead be modeled by a sequence of three or more links. Such restrictions are referred to as multilink constraints (MLCs). An example of an MLC is a constraint forbidding a crossing turn over a multilane road.

As further shown in FIG. 1J, and by reference number 190, the routing system 110 may generate modified routing data based on the multilink constraint and the CCCH. For example, the routing system 110 may handle multilink constraints by using constraint automata and the CCCH to generate the modified routing data. The constraint automata may include the routing system 110 comparing arc configurations to determine if a configuration A cannot be cheaper than another configuration B. If configuration A has one or more MLCs in progress at either the start or the end, then configuration B may be cheaper than configuration A, unless configuration B also has the same MLCs in progress. The constraint automata may also include the routing system 110 annotating each arc configuration with a cost, child arc configurations, a list of MLCs that are in-progress at both the start and end of the arc. This includes an identifier for the MLC and an index into the MLC's sequence of links. The constraint automata may also include the routing system 110 augmenting a search state at query time. As described above, the routing system 110 may select an optimal arc configuration for the vehicle 105. With MLCs it is possible that the optimal selection is ambiguous. For example, if the arc configuration with the lowest actual cost has a MLC in progress, it is possible but not guaranteed that it may ultimately result in a higher cost than some other arc configuration. In such situations, the routing system 110 may add multiple arc configurations for the same arc into a search heap, and may annotate a search state with any in-progress MLCs to disambiguate search heap elements that have reached a same link.

As further shown in FIG. 1J, and by reference number 195, the routing system 110 may provide the modified routing data to the vehicle 105. For example, the routing system 110 may provide the modified routing data to the vehicle 105, and the vehicle 105 may receive the modified routing data. The vehicle 105 and/or a driver of the vehicle 105 may utilize the modified routing data for traveling to the destination location. In some implementations, the routing system 110 may provide the modified routing data to the vehicle 105 via a digital communication network, a wireless transmission, or other suitable methods of data exchange, ensuring that the vehicle 105 receives accurate and timely modified routing data for navigation.

In this way, the routing system 110 generates conditional customizable contraction hierarchies for vehicle navigation. For example, the routing system 110 may construct a node-based graph from traffic data, and may generate, from the node-based graph, an edge-based graph that includes a prescribed vertex ordering and original road segments. The routing system 110 may recognize additional road segments to preserve network interconnectivity while considering rank-based prioritization of links, may integrate these additional road segments with the original road segments to assemble CCH segments, and may calculate configuration for each of the CCH segments. The routing system 110 may generate a CCCH based on the CCH segments and the configurations, and may utilize the CCCH to provide navigational data to a vehicle 105. Thus, the routing system 110 may conserve computing resources, networking resources, and/or other resources that would have otherwise been consumed by utilizing the time-consuming pre-processing stage to accommodate real-time road network changes, utilizing extensive searching and processing to establish cost-effective routes associated with conditional constraints, handling poor user experience associated with failing to provide accurate navigational routes that accommodate real-time road network changes, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
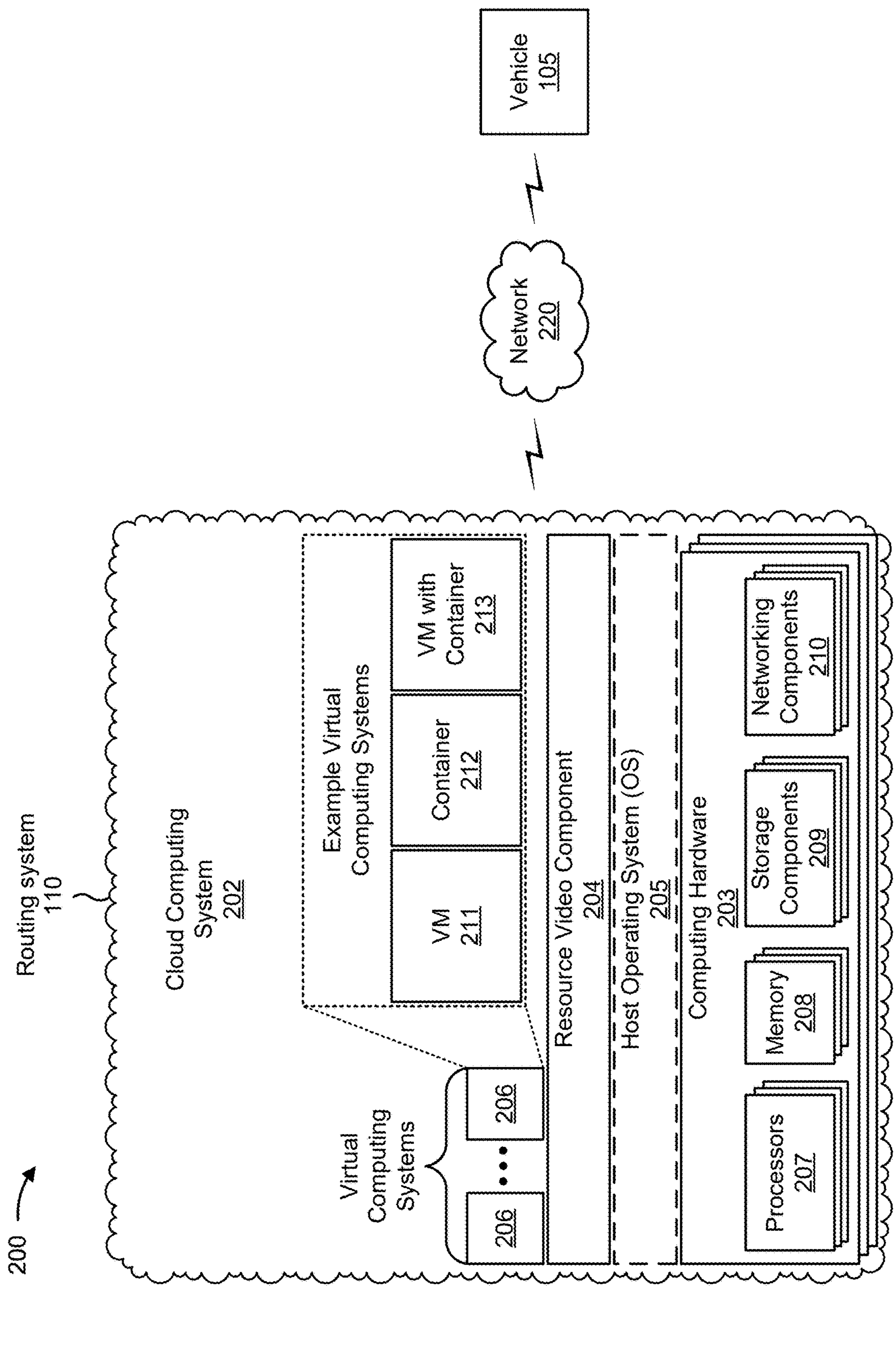
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the routing system 110, which may include one or more elements of and/or may execute within a cloud computing system 202. The cloud computing system 202 may include one or more elements 203-213, as described in more detail below. As further shown in FIG. 2, the environment 200 may include the vehicle 105 and a network 220. Devices and/or elements of the environment 200 may interconnect via wired connections and/or wireless connections.

The vehicle 105 may include a car, a truck, a motorcycle, a bus, a boat, farm equipment, construction equipment, and/or the like. In some examples, the vehicle 105 may include an autonomous vehicle, a semiautonomous vehicle, or a non-autonomous vehicle. In some implementations, the vehicle 105 may include a vehicle device capable of receiving, generating, storing, processing, and/or providing information, as described elsewhere herein. The vehicle device may include a communication device and/or a computing device. For example, the vehicle device may include a telematics device, a video camera, a dashboard camera, an inertial measurement unit, a three-axis accelerometer, a gyroscope, a GPS device, an OBD device, a vehicle tracking unit, an ECU, a user device (e.g., a cellular telephone, a laptop computer, and/or the like), and/or the like.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the routing system 110 may include one or more elements 203-213 of the cloud computing system 202, may execute within the cloud computing system 202, and/or may be hosted within the cloud computing system 202, in some implementations, the routing system 110 may not be cloud-based (e.g., may be implemented outside of a cloud computing system) or may be partially cloud-based. For example, the routing system 110 may include one or more devices that are not part of the cloud computing system 202, such as a device 300 of FIG. 3, which may include a standalone server or another type of computing device. The routing system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
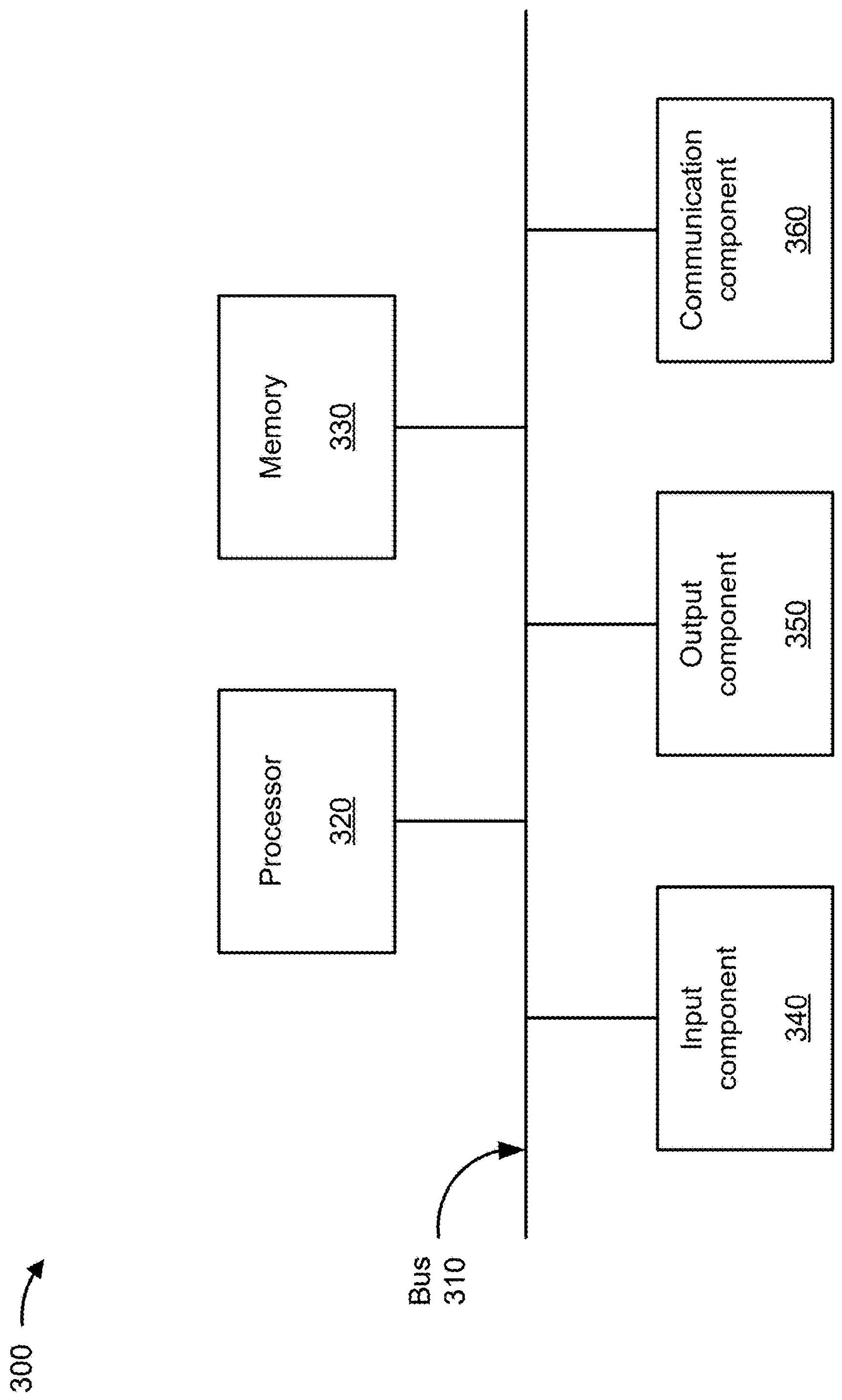
FIG. 3 is a diagram of example components of one or more devices of FIG. 2.

FIG. 3 is a diagram of example components of a device 300, which may correspond to the vehicle and/or the routing system 110. In some implementations, the vehicle and/or the routing system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
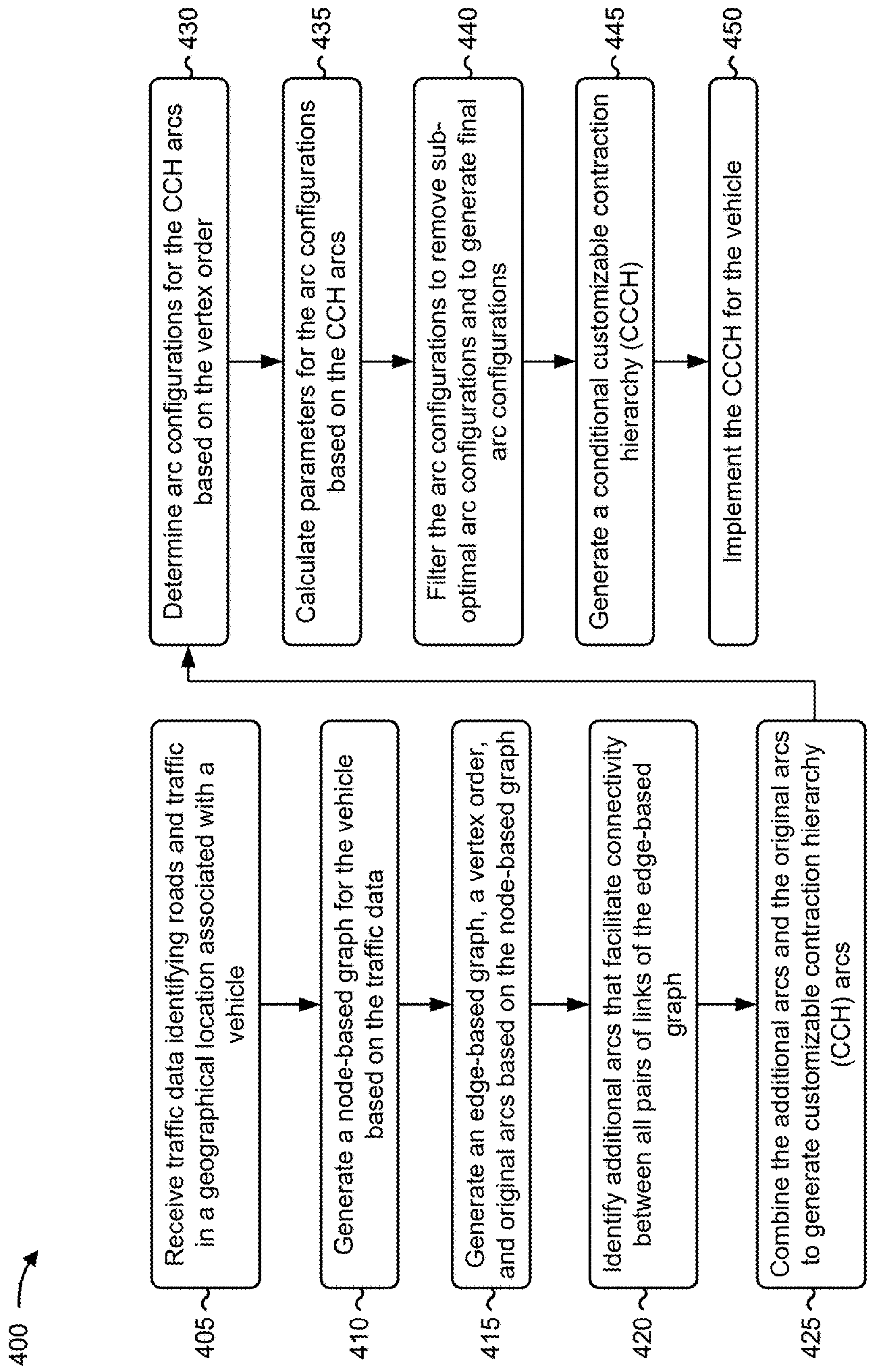
FIG. 4 is a flowchart of an example process for generating conditional customizable contraction hierarchies for vehicle navigation.

FIG. 4 depicts a flowchart of an example process 400 for generating conditional customizable contraction hierarchies for vehicle navigation. In some implementations, one or more process blocks of FIG. 4 may be performed by a device (e.g., the routing system 110). In some implementations, one or more process blocks of FIG. 4 may be performed by another device or a group of devices separate from or including the device, such as a vehicle (e.g., the vehicle 105). Additionally, or alternatively, one or more process blocks of FIG. 4 may be performed by one or more components of the device 300, such as the processor 320, the memory 330, the input component 340, the output component 350, and/or the communication component 360.

As further shown in FIG. 4, process 400 may include receiving traffic data identifying roads and traffic in a geographical location associated with a vehicle (block 405). For example, the device may receive traffic data identifying roads and traffic in a geographical location associated with a vehicle, as described above.

As further shown in FIG. 4, process 400 may include generating a node-based graph for the vehicle based on the traffic data (block 410). For example, the device may generate a node-based graph for the vehicle based on the traffic data, as described above. In some implementations, the node-based graph includes nodes corresponding to intersections in the roads and links connected to the nodes and corresponding to the roads.

As further shown in FIG. 4, process 400 may include generating an edge-based graph, a vertex order, and original arcs based on the node-based graph (block 415). For example, the device may generate an edge-based graph, a vertex order, and original arcs based on the node-based graph, as described above. In some implementations, the vertex order is generated based on a metric-independent ordering using an inertial flow partitioning of links in the node-based graph.

As further shown in FIG. 4, process 400 may include identifying additional arcs that facilitate connectivity between all pairs of links of the edge-based graph (block 420). For example, the device may identify additional arcs that facilitate connectivity between all pairs of links of the edge-based graph, according to link priority ordering, as described above.

As further shown in FIG. 4, process 400 may include combining the additional arcs and the original arcs to generate CCH arcs (block 425). For example, the device may combine the additional arcs and the original arcs to generate CCH arcs, as described above.

As further shown in FIG. 4, process 400 may include determining arc configurations for the CCH arcs based on the vertex order (block 430). For example, the device may determine arc configurations for the CCH arcs based on the vertex order of vertices in the edge-based graph, as described above.

As further shown in FIG. 4, process 400 may include calculating parameters for the arc configurations based on the CCH arcs (block 435). For example, the device may calculate parameters for the arc configurations based on examining lower triangles associated with the CCH arcs, as described above. In some implementations, each of the parameters for the arc configurations includes one or more of a path of one of the CCH arcs, a cost of one of the CCH arcs, a distance associated with one of the CCH arcs, a travel duration associated with one of the CCH arcs, and a condition associated with one of the CCH arcs. In some implementations, each of the parameters for the arc configurations includes a base cost and a conditional cost. In some implementations, the conditional cost is based on constraints associated with features of the vehicle, features of one of the roads, and traffic on the one of the roads.

In some implementations, calculating the parameters for the arc configurations based on examining the lower triangles associated with the CCH arcs includes iterating over vertices of the lower triangles based on the vertex order to calculate the parameters for the arc configurations. In some implementations, calculating the parameters for the arc configurations based on examining the lower triangles associated with the CCH arcs includes utilizing a cost model that is based on conditional constraints to calculate the parameters for the arc configurations.

As further shown in FIG. 4, process 400 may include filtering the arc configurations to remove sub-optimal arc configurations and to generate final arc configurations (block 440). For example, the device may filter the arc configurations to remove sub-optimal arc configurations and to generate final arc configurations, as described above.

As further shown in FIG. 4, process 400 may include generating a CCCH (block 445). For example, the device may combine the node-based graph, a priority order of links in the node-based graph, the original arcs, the CCH arcs, and the final arc configurations to generate a condition CCCH, as described above.

As further shown in FIG. 4, process 400 may include implementing the CCCH for the vehicle (block 450). For example, the device may implement the CCCH for the vehicle, as described above. In some implementations, implementing the CCCH for the vehicle includes generating routing data based on the CCCH, and providing the routing data to the vehicle.

In some implementations, process 400 includes receiving a routing query from the vehicle, generating routing data based on the routing query and the CCCH, and providing the routing data to the vehicle. In some implementations, process 400 includes receiving additional traffic data identifying a multilink constraint associated with the CCCH, generating routing data based on the multilink constraint and the CCCH, and providing the routing data to the vehicle.

In some implementations, process 400 includes receiving updated traffic data identifying updated traffic associated with the roads, and updating the CCCH based on the updated traffic data. In some implementations, process 400 includes receiving a routing query from the vehicle, performing a bidirectional Dijkstra search to calculate routing data based on the routing query and the CCCH, and providing the routing data to the vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by a device, a node-based graph for a vehicle based on traffic data identifying roads and traffic in a geographical location associated with the vehicle;

transforming, by the device, the node-based graph into an edge-based graph, and generating original arcs and a vertex order of vertices in the edge-based graph based on the node-based graph;

identifying, by the device, additional arcs that facilitate connectivity between all pairs of links of the edge-based graph, according to link priority ordering;

combining, by the device, the additional arcs and the original arcs to generate customizable contraction hierarchy (CCH) arcs;

determining, by the device, arc configurations for the CCH arcs based on the vertex order of vertices in the edge-based graph, wherein the device is configured to update the arc configurations in response to real-time conditions;

calculating, by the device, parameters for the arc configurations based on examining lower triangles associated with the CCH arcs;

filtering, by the device and using a machine learning model, the arc configurations to remove sub-optimal arc configurations and to generate final arc configurations;

combining, by the device, the node-based graph, a priority order of links in the node-based graph, the original arcs, the CCH arcs, and the final arc configurations to generate a conditional customizable contraction hierarchy (CCCH); and implementing, by the device, the CCCH for the vehicle.

2. The method of claim 1, wherein implementing the CCCH for the vehicle comprises:

generating routing data based on the CCCH; and providing the routing data to the vehicle.

3. The method of claim 1, further comprising:

receiving a routing query from the vehicle;

generating routing data based on the routing query and the CCCH; and providing the routing data to the vehicle.

4. The method of claim 1, further comprising:

receiving additional traffic data identifying a multilink constraint associated with the CCCH;

generating routing data based on the multilink constraint and the CCCH; and providing the routing data to the vehicle.

5. The method of claim 1, wherein each of the parameters for the arc configurations includes one or more of:

a path of one of the CCH arcs, a cost of one of the CCH arcs, a distance associated with one of the CCH arcs, a travel duration associated with one of the CCH arcs, and a condition associated with one of the CCH arcs.

6. The method of claim 1, wherein each of the parameters for the arc configurations includes a base cost and a conditional cost.

7. The method of claim 6, wherein the conditional cost is based on constraints associated with features of the vehicle, features of one of the roads, and traffic on the one of the roads.

8. A device, comprising:

one or more processors configured to:

generate a node-based graph for a vehicle based on traffic data identifying roads and traffic in a geographical location associated with the vehicle;

transform the node-based graph into an edge-based graph, and generate original arcs and a vertex order of vertices in the edge-based graph based on the node-based graph;

identify additional arcs that facilitate connectivity between all pairs of links of the edge-based graph, according to link priority ordering;

combine the additional arcs and the original arcs to generate customizable contraction hierarchy (CCH) arcs;

determine arc configurations for the CCH arcs based on the vertex order of vertices in the edge-based graph, wherein the one or processors are configured to update the arc configurations in response to real-time conditions;

calculate parameters for the arc configurations based on examining lower triangles associated with the CCH arcs;

filter, using a machine learning model, the arc configurations to remove sub-optimal arc configurations and to generate final arc configurations;

combine the node-based graph, a priority order of links in the node-based graph, the original arcs, the CCH arcs, and the final arc configurations to generate a conditional customizable contraction hierarchy (CCCH);

generate routing data based on the CCCH; and provide the routing data to the vehicle.

9. The device of claim 8, wherein the one or more processors, to calculate the parameters for the arc configurations based on examining the lower triangles associated with the CCH arcs, are configured to:

iterate over vertices of the lower triangles based on the vertex order to calculate the parameters for the arc configurations.

10. The device of claim 8, wherein the vertex order is generated based on a metric-independent ordering using an inertial flow partitioning of links in the node-based graph.

11. The device of claim 8, wherein the one or more processors are further configured to:

receive updated traffic data identifying updated traffic associated with the roads; and update the CCCH based on the updated traffic data.

12. The device of claim 8, wherein the node-based graph includes nodes corresponding to intersections in the roads and links connected to the nodes and corresponding to the roads.

13. The device of claim 8, wherein the one or more processors are further configured to:

receive a routing query from the vehicle;

perform a bidirectional Dijkstra search to calculate routing data based on the routing query and the CCCH; and provide the routing data to the vehicle.

14. The device of claim 8, wherein the one or more processors, to calculate the parameters for the arc configurations, are configured to:

utilize a cost model that is based on conditional constraints to calculate the parameters for the arc configurations.

15. A non-transitory computer-readable medium storing a set of instructions, the set of instructions comprising:

one or more instructions that, when executed by one or more processors of a device, cause the device to:

generate a node-based graph for a vehicle based on traffic data identifying roads and traffic in a geographical location associated with the vehicle;

transform the node-based graph into an edge-based graph, and generate original arcs and a vertex order of vertices in the edge-based graph based on the node-based graph, wherein the vertex order is generated based on a metric-independent ordering using an inertial flow partitioning of links in the node-based graph;

identify additional arcs that facilitate connectivity between all pairs of links of the edge-based graph, according to link priority ordering;

combine the additional arcs and the original arcs to generate customizable contraction hierarchy (CCH) arcs;

determine arc configurations for the CCH arcs based on the vertex order, wherein the device is configured to update the arc configurations in response to real-time conditions;

calculate parameters for the arc configurations based on examining lower triangles associated with the CCH arcs;

filter, using a machine learning model, the arc configurations to remove sub-optimal arc configurations and to generate final arc configurations;

combine the node-based graph, a priority order of links in the node-based graph, the original arcs, the CCH arcs, and the final arc configurations to generate a conditional customizable contraction hierarchy (CCCH); and implement the CCCH for the vehicle.

16. The non-transitory computer-readable medium of claim 15, wherein the one or more instructions, that cause the device to implement the CCCH for the vehicle, cause the device to:

generate routing data based on the CCCH; and provide the routing data to the vehicle.

17. The non-transitory computer-readable medium of claim 15, wherein the one or more instructions further cause the device to:

receive a routing query from the vehicle;

generate routing data based on the routing query and the CCCH; and provide the routing data to the vehicle.

18. The non-transitory computer-readable medium of claim 15, wherein the one or more instructions further cause the device to:

receive additional traffic data identifying a multilink constraint associated with the CCCH;

generate routing data based on the multilink constraint and the CCCH; and provide the routing data to the vehicle.

19. The non-transitory computer-readable medium of claim 15, wherein the one or more instructions, that cause the device to calculate the parameters for the arc configurations based on examining the lower triangles associated with the CCH arcs, cause the device to:

iterate over vertices of the lower triangles based on the vertex order to calculate the parameters for the arc configurations.

20. The non-transitory computer-readable medium of claim 15, wherein the one or more instructions, that cause the device to calculate the parameters for the arc configurations, cause the device to:

utilize a cost model that is based on conditional constraints to calculate the parameters for the arc configurations.

* * * * *